US012619519B2

(12) United States Patent
Morse et al.

(10) Patent No.: US 12,619,519 B2
(45) Date of Patent: May 5, 2026

(54) APPARATUS AND METHOD FOR SIMULATED VIRTUAL COMPONENT DEVELOPMENT

(71) Applicant: Parry Labs, LLC, Alexandria, VA (US)

(72) Inventors: David Morse, Alexandria, VA (US); David Walsh, Alexandria, VA (US)

(73) Assignee: Parry Labs, LLC, Alexandria, VA (US)

( * ) Notice: Subject to any disclaimer, the term of this patent is extended or adjusted under 35 U.S.C. 154(b) by 0 days.

(21) Appl. No.: 18/607,260

(22) Filed: Mar. 15, 2024

(65) Prior Publication Data

US 2025/0291703 A1     Sep. 18, 2025

(51) Int. Cl.
*G06F 11/362*     (2025.01)
*G06F 11/3698*     (2025.01)

(52) U.S. Cl.
CPC ...... *G06F 11/3652* (2013.01); *G06F 11/3698* (2025.01)

(58) Field of Classification Search
None
See application file for complete search history.

(56) References Cited

U.S. PATENT DOCUMENTS

| | | | | |
|---|---|---|---|---|
| 9,959,199 | B2 | 5/2018 | Ignatyev | |
| 10,963,243 | B2 | 3/2021 | Alexander | |
| 11,321,054 | B2 | 5/2022 | Gaitonde | |
| 12,072,792 | B2 * | 8/2024 | Drozhak | G06F 11/3692 |
| 2013/0185594 | A1 * | 7/2013 | Budnik | G06F 11/3668 |
| | | | | 714/38.1 |

| | | | | |
|---|---|---|---|---|
| 2013/0318397 | A1 * | 11/2013 | Jamison | G06F 8/63 |
| | | | | 714/E11.178 |
| 2016/0034382 | A1 * | 2/2016 | Kumar | G06F 11/3676 |
| | | | | 717/124 |
| 2016/0188445 | A1 * | 6/2016 | Hermeto | G06F 11/3684 |
| | | | | 714/38.1 |
| 2018/0239692 | A1 * | 8/2018 | Kalyanasundram | |
| | | | | G06F 11/3684 |
| 2018/0324204 | A1 * | 11/2018 | McClory | G06F 9/5027 |
| 2019/0155970 | A1 * | 5/2019 | Matthews | G06F 30/20 |
| 2019/0235994 | A1 * | 8/2019 | Epperlein | G06F 11/3696 |
| 2021/0081304 | A1 * | 3/2021 | Masis | G06F 9/45533 |
| 2021/0133210 | A1 * | 5/2021 | Kanagovi | G06F 16/285 |
| 2022/0261240 | A1 * | 8/2022 | Abbas | G06F 8/71 |
| 2022/0350641 | A1 * | 11/2022 | Gilmore | G06F 11/3664 |
| 2023/0028146 | A1 * | 1/2023 | Harwood | G06F 11/3692 |
| 2023/0125342 | A1 * | 4/2023 | Krishna | G06F 16/192 |
| | | | | 707/639 |
| 2024/0095155 | A1 * | 3/2024 | Zhao | G06F 11/3684 |
| 2024/0160557 | A1 * | 5/2024 | Bolshakov | G06F 8/60 |

FOREIGN PATENT DOCUMENTS

CN     112130930 B     8/2023

* cited by examiner

*Primary Examiner* — Jason D Mitchell
(74) *Attorney, Agent, or Firm* — Caldwell LLC

(57)     ABSTRACT

An apparatus for, and method of, simulated virtual component testing, including a processor and a memory, the processor configured to receive a specification datum, receive an application datum, generate emulation parameters as a function of the specification datum, generate a testing framework as a function of the emulation parameters, determine an integration datum as a function of the testing framework and the application datum, output a compatibility datum as a function of the integration datum, and display a user interface.

12 Claims, 6 Drawing Sheets

APPARATUS AND METHOD FOR SIMULATED VIRTUAL COMPONENT DEVELOPMENT

FIELD OF THE INVENTION

The present invention generally relates to the field of circuit development and integration. In particular, the present invention is directed to engineering development support.

BACKGROUND

Testing compatibility in a system between software applications and electronic components is vital for proper integration and functioning of the system. However, there are circumstances where access to those components is limited.

SUMMARY OF THE DISCLOSURE

In an aspect an apparatus for virtual component testing includes at least a processor and a memory communicatively connected to the at least a processor, where the memory contains instructions configuring the at least a processor to receive a specification datum, receive an application datum, generate emulation parameters as a function of the specification datum, generate an testing framework as a function of the emulation parameters, determine an integration datum as a function of the testing framework and the application datum, output a compatibility datum as a function of the integration datum, and display a user interface.

In another aspect a method of virtual component testing, wherein the method includes receiving a specification datum, receiving an application datum, generating emulation parameters as a function of the specification datum, generating a testing framework as a function of the emulation parameters, determining an integration datum as a function of the testing framework and the application datum, outputting a compatibility datum as a function of the integration datum, and displaying a user interface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for simulated virtual component development. In an embodiment, apparatus 100 may be used to create a full digital twin of a virtual component. Exemplary embodiments illustrating aspects of the present disclosure are described below in the context of several specific examples.

Figure 1:
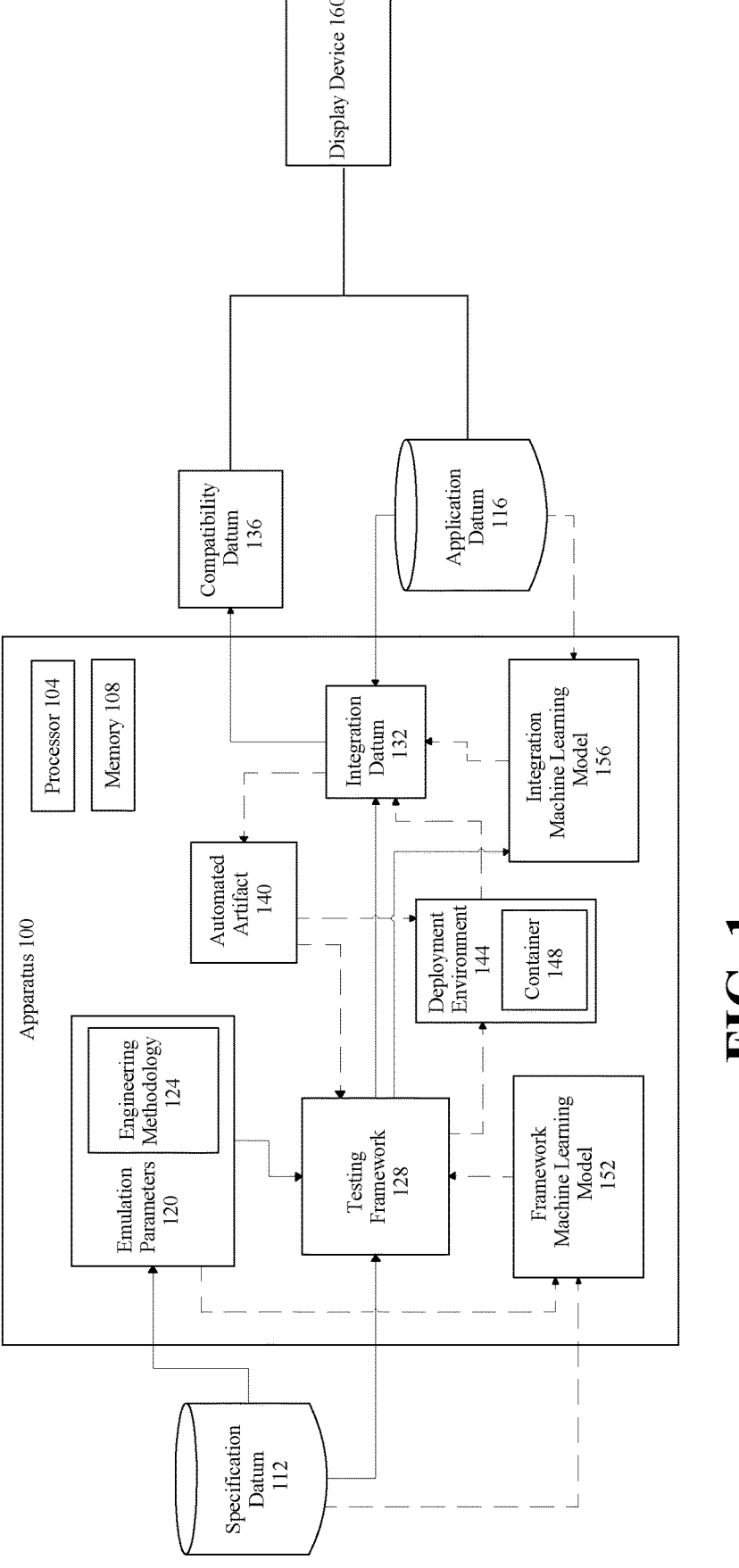
FIG. 1 is a representation of an apparatus for simulated virtual component development.

Referring now to FIG. 1, an exemplary embodiment of an apparatus 100 for simulated virtual component development is illustrated. The apparatus 100 includes at least a processor 104. Processor 104 and at least a processor 104 are used interchangeably throughout this disclosure. Processor 104 may include, without limitation, any processor described in this disclosure. Processor 104 may be included in a computing device. Computing device may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor may include, and/or be included in, a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. The computing device may include but is not limited to, for example, a computing device or cluster of computing devices in a first location and a second computing device or cluster of computing devices in a second location. The computing device may include one or more computing devices dedicated to data storage, security, distribution of traffic for load balancing, and the like. Processor 104 may distribute one or more computing tasks as described below across a plurality of computing devices, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, an apparatus 100 includes a memory 108 communicatively connected to at least a processor 104. For the purposes of this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

In an embodiment, methods and apparatuses described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q. A further example of asymmetrical cryptography may include lattice-based cryptography, which relies on the fact that various properties of sets of integer combination of basis vectors are hard to compute, such as finding the one combination of basis vectors that results in the smallest Euclidean distance. Embodiments of cryptography, whether symmetrical or asymmetrical, may include quantum-secure cryptography, defined for the purposes of this disclosure as cryptography that remains secure against adversaries possessing quantum computers; some forms of lattice-based cryptography, for instance, may be quantum-secure.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. In one embodiment, credentials generated are verifiable credentials that are tamper-proof statements regarding a user that are cryptographically signed by a generator of the credentials. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of O $(2n/2)$ for n output bits; thus, it may take on the order of $2256$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. In some embodiments, a verifier may authenticate the generated credential via a decentralized identifier by using public/private key pairs on an immutable sequential listing to verify that the hashed credential belongs to a specific user. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. In some embodiments, through zero-knowledge proof claims, users may not need to expose their private credential and/or identity information to a decentralized platform as the validity of users' real-world credential and/or identity information is attested via a privacy-preserving protocol enabled by zero-knowledge proof technology while still remaining private. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other par ty to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

A "credential," as used in this disclosure, is information related to or defining an entity's authority, authorization, status, rights, access, or entitlement to privileges. In some embodiments, a user's credential may include a validation of the user's legal identity, social identity, financial identity, proof of creation, proof of interaction, proof of personhood, and the like. For instance, in a non-limiting example, the legal identity may include the user's real name, date of birth, home address, government ID such as driver's license, credit report, social security number, and the like. As used in this disclosure, a "social identity," is any identity information derived and/or attested from a relevant social group where the user is a member of. For instance, in a non-limiting example, the user's social identity may include identities and/or membership associated with a social media platform such as Facebook®, Twitter®, membership associated with a decentralized community, and the like. In some embodiments, the user's social identity may be the user's profile name and/or pictures associated with the user profile.

Continuing to refer to FIG. 1, in embodiment, apparatus 100 be an edge computing device. An "edge computing device," as used herein, is a computing device configured to operate within close proximity to a data source. In some embodiments, an edge computing device may be a device with limited processing power. In a non-limiting example, edge computing device may be a gateway device configured to read data generated by one or more sensors. In some embodiments, edge computing device may be battery powered. In some embodiments, edge computing device may be configured to be portable. In embodiments, edge computing device may be enclosed by a water-resistant material. In some embodiments, edge computing device may be enclosed by a water-proof material. In some embodiments, edge computing may be enclosed in a shock-resistant casing. In some embodiments, edge computing device may be enclosed in a bullet-proof casing. In embodiments, edge computing device may include a SWaP-Optimized (Size, Weight, and Power) connectors. As used herein, "SWAP-Optimized connectors" refers to a type of connector that has been designed with the principles of Size, Weight, and Power optimization. In a non-limiting example, edge computing device may be configured to be used by tactical units in a battlefield.

In some embodiments, and still referring to FIG. 1, apparatus 100 may be a reduced instruction set computer (RISC). As used in this disclosure, "a reduced instruction set computer (RISC)" is a type of computing device, particularly a microprocessor that is designed to perform a smaller number (ranges from around 50 or less to a few hundred instructions or more) of (computer) instruction at a high speed (within one clock cycle). In some cases, RISC may include a processor using few dozen of simple instructions, which may be executed within a single clock cycle, as opposed to complex instruction set computers (CISC) that have instructions that may take a plurality of clock cycles to execute. In one or more embodiments, instructions may be classified as simple instructions when instructions only contain basic operations, such as, without limitation, arithmetic (e.g., add, subtract, multiply, divide, and/or the like), logical operations (e.g., and, or, not), data movement (import/export, upload, store, and/or the like), and any other desired operations that are designed to be performed quickly and efficiently. In some cases, instructions used by RISC processor may be fixed in length, for example, 32 bits. In some cases, memory access in RISC designs may be limited to load and store instructions such as any instructions as described herein. In some cases, however, operations executed by RISC may take more than one clock cycle, for example, execution time of one or more operations may depend on memory system's speed (but RISC may be configured to keep these operations as fast as possible). In a non-limiting example, memory 108 may be accessed through LOAD i.e., to load a memory location and STORE i.e., to write to it, wherein all other instructions may operate on one or more processor registers and processor 104 may not have direct access to manipulate memory 108. In some cases, RISC processor may include fewer addressing modes than CISC processor to simply hardware components required for decoding and/or executing instructions. In a non-limiting example, instructions may include one or more register-to-register (register-based) operation in which arithmetic and logical operations listed above are performed between registers, and if data is needed from memory 108, the data may be first loaded into at least one register. In some cases, RISC may be capable of pipeline processing, wherein simple and uniform instruction sets may enable optimal pipeline processing; for instance, subsets of instruction sets may be overlapped. Additionally, RISC may operate only on a smaller number of data types (e.g., integer, float, character, Booleans, pointers, and/or the like). RISC may be configured to perform instruction sets in parallel to increase the rate at which instructions are executed. Exemplary RISC may include, without limitation, ARM, MIPS, POWERPC, SPARC, and the like.

Still referring to FIG. 1, in embodiments, processor 104 is configured to receive a specification datum 112. A "specification datum," as used herein, is an element of data, which describes a hardware component technical specifications and hardware emulation requirements. "Hardware component technical specifications," as used herein, are descriptions of the physical characteristics of a component. A "hardware emulation requirement," as used herein, is a description of the functionality of one or more components to be tested. In a nonlimiting example, specification datum 112 may describe physical characteristics of components and their functionalities. Continuing with this non-limiting example, specification datum 112 may include data representing angle of attack (AoA) sensors, Outside Air Temperature (OAT) sensors, a flight control microcontroller, and a display. In a non-limiting embodiment, specification datum 112 may include a controller card. As used herein, "controller card" refers to a hardware component that may be connected to a computing device in order to provide additional or improved capabilities. In a non-limiting embodiment, specification datum 112 may include a boot operating storage solution (BOSS) card. As used herein, a "boot operating storage solution card" refers to a specialized controlled card configured to improve the boot times on a computing device. In a non-limiting embodiment, specification datum 112 may include a virtual cross path (VPX) controller card. As used herein, "VPX controller card" refers to a controller card that has met the standards and/or limitations of the VMEbus International Trade Association. Additional disclosure related controller cards, BOSS cards, and the like may be found in U.S. patent application Ser. No. 18/422,068, filed on Jan. 25, 2024, entitled "HARDWARE APPARATUS FOR ISOLATED VIRTUAL ENVIRONMENTS," the entirety of which is incorporated herein by reference.

With continued reference to FIG. 1, in some embodiments, specification datum 112 may include Field Programmable Gate Array (FPGA). As used herein, "FPGA" refers to a chip that may be programmed and/or reprogrammed after manufacturing. FPGA may include a series of registers and logical gates. In a non-limiting embodiment, FPGA registers may be turned on and off in order to program FPGA. This may be used to, for example, run a specific algorithm many times using hardware rather than software instructions. In a non-limiting embodiment, specification datum 112 may include any series of registers or logical gates associated with the FPGA. Additional disclosure related to controller cards, BOSS cards, and the like may be found in U.S. patent application Ser. No. 18/422,122, filed on Jan. 25, 2024, entitled "APPARATUS FOR HETEROGENOUS PROCESSING," the entirety of which is incorporated herein by reference.

With continued reference to FIG. 1, in some embodiments, specification datum 112 may include a dedicated software package. As used herein, a "dedicated software package" refers to components necessary to execute a software package. In a non-limiting embodiment, dedicated software package may include a library or a plurality of libraries wherein the libraries contain pre-written code that can be called by various software and/or applications such as a software module. In an embodiment, dedicated software package may include various software configurations for a software module. As used herein, "software configuration" refers to instructions and parameters that define how the software module should operate. Additional disclosure related to dedicated software packages, and the like may be found in U.S. patent application Ser. No. 18/395,210, filed on Dec. 22, 2023, entitled "SYSTEM AND METHOD FOR A SAFETY CRITICAL OPERATING ENVIRONMENT CONTAINER ARCHITECTURE," the entirety of which is incorporated herein by reference.

With continued reference to FIG. 1, in some embodiments, processor 104 is configured to receive an application datum 116. As used herein, an "application datum" is a data component that describes the functioning and deployment of a software application configured to operate on a hardware component. A "software application," as used herein is a set of instructions configuring processor 104, or any set of processors, to perform an action. This setup allows for adaptable and tailored software functionalities to be applied to hardware components, enabling them to perform complex and specific operations as dictated by the needs of the system or the user. In an embodiment, specification datum 112 may have an associated application datum 116, where the application datum describes the functioning and deployment of the specification datum and any other associated software applications.

Continuing to refer to FIG. 1, in an embodiment, at least a processor 104 is configured to determine emulation parameters 120 as a function of specification datum 112. An "emulation parameters," as used herein, are the system configuration settings required to emulate the integration of a software program with the specific hardware components. In a non-limiting example, emulation parameter 120 may be configured to generate a "digital twin." As used herein, a "digital twin" refers to a simulation of a system. A digital twin may mirror attributes and dynamic behaviors of working systems or devices. Emulation parameters found within a digital twin system may be updated and changed as the specification datum operates and is updated. Digital twin may represent hardware, firmware, BUS, virtual BUS elements, software environments (such as hypervisor, container, etc.), and any software (including third-party software) that has been loaded onto processor 104. The digital twin may be capable of simulating attributes of any of the above described elements, as well as their interactions. Interactions that may be simulated by the digital twin may include simulating data paths, processor configurations, software applications, and the like. In a non-limiting embodiment, simulating a data path allows a digital twin to analyze how data moves through the system, identify bottlenecks, and predict the impact of changes or updates within the system. In another non-limiting embodiment, digital twin may model interactions between hardware and software, such as specification datum 112 and application datum 116, to understand how they affect each other. This may include an emulation of how a software application's performance changes with various processor configurations or understanding how updates to a specification datum may impact the overall system's functionality. Digital twin and emulation parameters may allow for real-time monitoring and adjustments. This may enable predictive maintenance by identifying potential issues before they occur, optimizing performance by fine-tuning configurations, and aiding in decision-making processes by providing detailed insights into how changes may affect the system. In some embodiments, determining emulation parameters 120 may include identifying an engineering methodology 124. An "engineering methodology," as used in this disclosure, is a systematic and structured approach for designing, testing, and implementing engineering solutions. In an embodiment, engineering methodology may comprise a framework or set of procedures that may provide a structured approach to solve engineering problems. In embodiments, engineering methodology 124 may include waterfall methodology, agile methodology, lean engineering methodology, model-based engineering (MBE) methodology, test-driven development (TDD) methodology, and the like. In a non-limiting example, emulation parameters 120 may include a model-based engineering (MBE) engineering methodology 124, where the parameters for emulation include a whole system where specification datum 112 would be tested. In another non-limiting example, emulation parameters 120 may include an agile engineering methodology, where sub-components of a component included in specification datum 112 are iteratively tested before the whole component is tested.

A person with ordinary skill in the art would appreciate how each type of engineering methodology 124 may affect how a component is emulated and tested.

With continued reference to FIG. 1, in embodiments, processor 104 is configured to generate a testing framework 128 as a function of emulation parameters 120 and specification datum 112. As used throughout this disclosure, a "testing framework" is a set of test cases specifically tailored for the emulated environment and the hardware components being tested. In some embodiments, generating testing framework 128 may include generating automated testing scripts. In a non-limiting embodiment, emulation parameters may include settings and conditions under which the hardware or software is to be emulated, such as performance metrics, environmental conditions, user interactions and the like. Specification parameters may provide detailed descriptions of the hardware's expected functionalities, performance criteria, and operational limits. Testing framework may include specific test cases which may be designed to validate the hardware's performance and functionality against the emulation parameters and specification datums. Specific test cases may be customized to reflect the real-world demands and operating conditions expected of the hardware component. Testing framework 128 may include automated testing scripts which may be programmed to run tests automatically without manual intervention, to ensure that every aspect of the hardware is iteratively tested under consistent conditions. Testing framework may integrate with an emulated environment based on emulation parameters. Testing framework may include an iterative testing process to ensure that the framework results remain relevant and effective.

Continuing to refer to FIG. 1, in some embodiments, processor 104 may be configured to generate testing framework 128 using a framework machine learning model 152. As used herein, a "framework machine learning model" is a mathematical representation of the correlation between specification datum 112 and emulation parameters 120 with a testing framework. Framework machine learning model may be trained using framework training data. Framework training data may correlate inputs to outputs. In some embodiments, inputs may include specification datum, historical versions of specification datum, emulation parameters, historical versions of emulation parameters, digital twins, historical versions of digital twins, previous iterations of framework training data, examples of specification datum, examples of emulation parameters, examples of digital twins, and the like. In embodiments, framework machine learning model 152 may be configured to receive specification datum 112 and emulation parameters 120 as inputs and output testing framework 128. In a non-limiting example, framework machine learning model 152 may make predictions of test cases and testing environment based on previous correlations of similar emulation requirements and component specifications. Framework machine learning model 152 may include any machine learning model described throughout this disclosure. Framework machine learning model 152 include any methods and processes described with reference to FIGS. 2-4.

With continued reference to FIG. 1, in embodiments, processor 104 is configured to determine an integration datum 132 as a function of testing framework 128 and application datum 116. As used herein, an "integration datum" are test results related to how well a software application integrates with one or more hardware components. In embodiments, integration datum 132 may be configured to identify aspects of utilization of the digital twin prior to generation. In a non-limiting embodiment, configuration managed images of hardware and software may be traceable to managed hardware and software baselines. Integration datum may be used to identify and understand various aspects of the digital twin before its generation. Integration datum 132 may be configured to identify key attributes or characteristics of a software application, such as the digital twin, by including parameters related to the software application such as design specifications, operational parameters, and the like. In a non-limiting embodiment, integration datum 132 may measure potential changes or characteristics of a software application, such as the digital twin, and compare these measured characteristics or changes to a baseline which may serve as a standard for operability. In some embodiments, processor 104 may be further configured to generate integration datum 132 within deployment environment 144. In further embodiments, processor 104 may be further configured to generate integration datum 132 within containerized environment 148. In a non-limiting example, integration datum 132 may include a plurality of test results, where some may pass, while others may fail. In other examples, integration datum 132 may include an aggregation of all test results, such as a score showing a percentage of pass and failed tests. In an exemplary embodiment, integration datum 132 may be generated in real-time during simulating, testing, executing, and the like associated with the deployed software application. In some embodiments, integration datum 132 results may be used to modify testing framework 128.

Continuing to refer to FIG. 1, in embodiments, processor 104 be may further configured to generate integration datum 132 using a vector database. As used herein, a "vector database" is a database system tailored to manage and process vector data. A "vector" as defined in this disclosure is a data structure that represents one or more a quantitative values and/or measures of simulated data. In a non-limiting example, vector database may be used for quickly retrieving test scenarios based on similarity metrics. In embodiments, similarity metrics may include cosine similarity, Euclidean distance, Manhattan distance, Jaccard similarity, hamming distances, and the like. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute 1 as derived using a Pythagorean norm:

$$l = \sqrt{\sum_{i=0}^{n} a_i^2},$$

where ai is attribute number i of the vector. Scaling and/or normalization may function to make vector comparison independent of absolute quantities of attributes, while preserving any dependency on similarity of attributes.

A two-dimensional subspace of a vector space may be defined by any two orthogonal vectors contained within the vector space. A vector's "norm' is a scalar value, denoted $\|a\|$ indicating the vector's length or size, and may be defined, as a non-limiting example, according to a Euclidean norm for an n-dimensional vector a as:

$$\|a\| = \sqrt{\sum_{i=0}^{n} a_i^2}$$

In an embodiment, and with continued reference to FIG. 1, each testing set may be represented by a dimension of a vector space; as a non-limiting example, each element of a vector may include a number representing an enumeration of co-occurrences of a first test, based on set conditions and components, represented by the vector with second test. Alternatively, or additionally, dimensions of vector space may not represent distinct testing set, in which case elements of a vector representing a first test may have numerical values that together represent a geometrical relationship to a vector representing a second test, wherein the geometrical relationship represents and/or approximates a semantic relationship between the first test and the second test. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below.

Any vectors as described herein may be scaled, such that each vector represents each attribute along an equivalent scale of values. In an embodiment associating testing sets to one another as described above may include computing a degree of vector similarity between a vector representing each test and a vector representing another test; vector similarity may be measured according to any norm for proximity and/or similarity of two vectors, including without limitation cosine similarity. As used in this disclosure "cosine similarity" is a measure of similarity between two non-zero vectors of a vector space, wherein determining the similarity includes determining the cosine of the angle between the two vectors. Cosine similarity may be computed as a function of using a dot product of the two vectors divided by the lengths of the two vectors, or the dot product of two normalized vectors. For instance, and without limitation, a cosine of 0° is 1, wherein it is less than 1 for any angle in the interval (0,π) radians. Cosine similarity may be a judgment of orientation and not magnitude, wherein two vectors with the same orientation have a cosine similarity of 1, two vectors oriented at 90° relative to each other have a similarity of 0, and two vectors diametrically opposed have a similarity of −1, independent of their magnitude. As a non-limiting example, vectors may be considered similar if parallel to one another. As a further non-limiting example, vectors may be considered dissimilar if orthogonal to one another. As a further non-limiting example, vectors may be considered uncorrelated if opposite to one another. Additionally, or alternatively, degree of similarity may include any other geometric measure of distance between vectors.

Continuing to refer to FIG. 1, in some embodiments, vector database may be used for context insertion. As used herein, "context insertion," is the process of incorporating additional information represented as numerical vectors. In embodiments, context insertion may include providing additional emulation parameters for generating testing framework 128. In other embodiments, context insertion may include automated artifacts 140, where the vector database is used to provide additional information for generating deployment environment 144. In a non-limiting example, context insertion may be used to provide additional data for generating deployment environment 144 based on testing framework 128.

With continued reference to FIG. 1, in some embodiments, processor 104 may be further configured to determine integration datum 132 using an integration machine learning model 156. An "integration machine learning model," as used herein, is a machine-learning model as described in further detail below configured to receive application datum 116 and testing framework as inputs and output integration datum 132. In an embodiment, integration machine learning model may be trained with integration training data that comprises inputs correlated to outputs. In a non-limiting example, inputs used for integration training data may include application datum, historical versions of application datum, user-inputs, previous inputs of integration machine-learning model, examples of application datum, historical integration datums, and the like. Outputs to integration machine learning model may be used as inputs in future iterations. Integration machine learning model may be iteratively retrained with updated integration training data. Integration machine learning model may be trained as described in further detail within the disclosure. Integration machine learning model 156 may be consistent with any machine learning model as described with reference to FIGS. 3-5.

Still referring to FIG. 1, in some embodiments, processor 104 is configured to output a compatibility datum 136 as a function of integration datum 132. As used herein, a "compatibility datum" is a binary representation of whether the software application and hardware component being tested can be integrated with each other. In an embodiment, processor 104 may be configured to compare integration datum 132 to a set threshold. In a non-limiting example, processor 104 may compare the total of successful tests to a threshold, where compatibility datum 136 may be outputted as "compatible" even if some of the test results are negative. In embodiments, processor 104 may compare integration datum 132 to multi-level thresholds. A "multi-level thresh-old," as used herein, are thresholds based on the importance level of each test. In a non-limiting example, some test cases may be marked as "high priority," where even one failure might be above the threshold, while other test cases may be marked as "important," where a lower threshold of failure is used.

Continuing to refer to FIG. 1, in some embodiments, at least a processor 104 may be further configured to generate at least an automated artifact 140. An "automated artifact," as used herein, is an element of data generated through automated processes within an engineering development. In some embodiments, processor 104 is configured to generate automated artifact 140 as a function of integration datum. In additional embodiments, processor 104 may be further con-figured to generate automated artifact as a function of compatibility datum 136. In non-limiting examples, auto-mated artifact 140 may include executable files, automated testing scripts, containerized environment 148 deployment files, test reports, test logs, automated code and testing documentation, configuration files, libraries, and depen-dency packages, and the like. One of ordinary skill in the art would appreciate that these are presented as way of example only and many other types of data may be included in automated artifact 140.

Still referring to FIG. 1, in an embodiment, at least a processor 104 may be configured to generate a deployment environment 144 as a function of emulation parameters 120. As used herein, a "deployment environment" is a configur-able infrastructure configured to replicate real-world condi-tions for testing purposes. In a non-limiting example, deployment environment may include emulated flight sce-narios and environmental conditions. In some embodiments, generating deployment environment 144 may include deploying a containerized environment 148. As used here, a "containerized environment" is an isolated and portable deployment environment 144. In some embodiments, con-tainerized environment 148 may be one container. In a non-limiting example, containerized environment 148 may include a Docker container created by Docker, Inc. head-quartered in Palo Alto, CA USA. In embodiments, contain-erized environment 148 may include a container orchestra-tion system. In embodiments, container orchestration system may include the open-source Kubernetes orchestration sys-tem made by the Linux Foundation located in San Francisco, CA USA. In some embodiments, containerized environment 148 may include a container image. A "container image," as described herein, is a snapshot or a packaged representation of an entire software state, including executable code, con-figurations, dependencies/libraries, and other required data. In some cases, container image may include source code, libraries, and other software components that the software relies on. In some cases, container image may include one or more configuration files which define a plurality of settings, parameters, and other configurations for the software. In some cases, configuration files may include certain OS configurations, environmental variables, or other system-level settings. In a non-limiting example container image may include a portable executable image combined with a manifest file that is used by a container manager as described below to deploy the container image on an operating envi-ronment with appropriate data services and restrictions. In some cases, container image may be used to package a software application with its entire collection of dependen-cies, ensuring that the software application can run consis-tently across different SOEs. Exemplary software applica-tions may include, without limitation, flight management system (FMS) software, air traffic control (ATC) software, avionics software, electronic flight bag (EFB) software, ground support equipment software, weather forecasting and reporting software, cockpit display rendering software, and/or the like.

In some cases, container image may include a VM image that encapsulate a whole OS along with one or more pre-installed software applications. In embodiments, deployment environment 144 may be easily replicated across a plurality of host circuits e.g., servers or cloud environment. In other cases, container image may be used as a backup snapshot to restore/roll back system or a software application to a known working state. In a non-limiting embodiment, deployment environment 144 may implement programming changes made using emulation parameters into an original system, software system, hardware system, and the like. In another non-limiting environment, deploy-ment environment may run several deployment programs independent each other, with each deployment environment running smoothly while being independent of another deployment environment.

In some embodiments, and continuing to refer to FIG. 1, processor 104 may be configured to be communicatively connected to a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as cat-egories and/or populations of data consistently with this disclosure.

Still referring to FIG. 1, processor 104 may be configured to display user interface using a display device 160. As used in the current disclosure, a "display device" is a device that is used to display a plurality of data and other digital content. Display device 160 may include a user interface. A "user interface," as used herein, is a means by which a user and a computer system interact; for example, through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop oper-ated by the user. In an embodiment, the user interface may include a graphical user interface. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pulldown menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc., because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like. User interface may be configured to display different levels of emulation parameters, digital twins, deployment environments, and the like. User interface may be able to show different levels of architectural and structural details of software, hardware, simulated systems, and the like.

Figure 2:
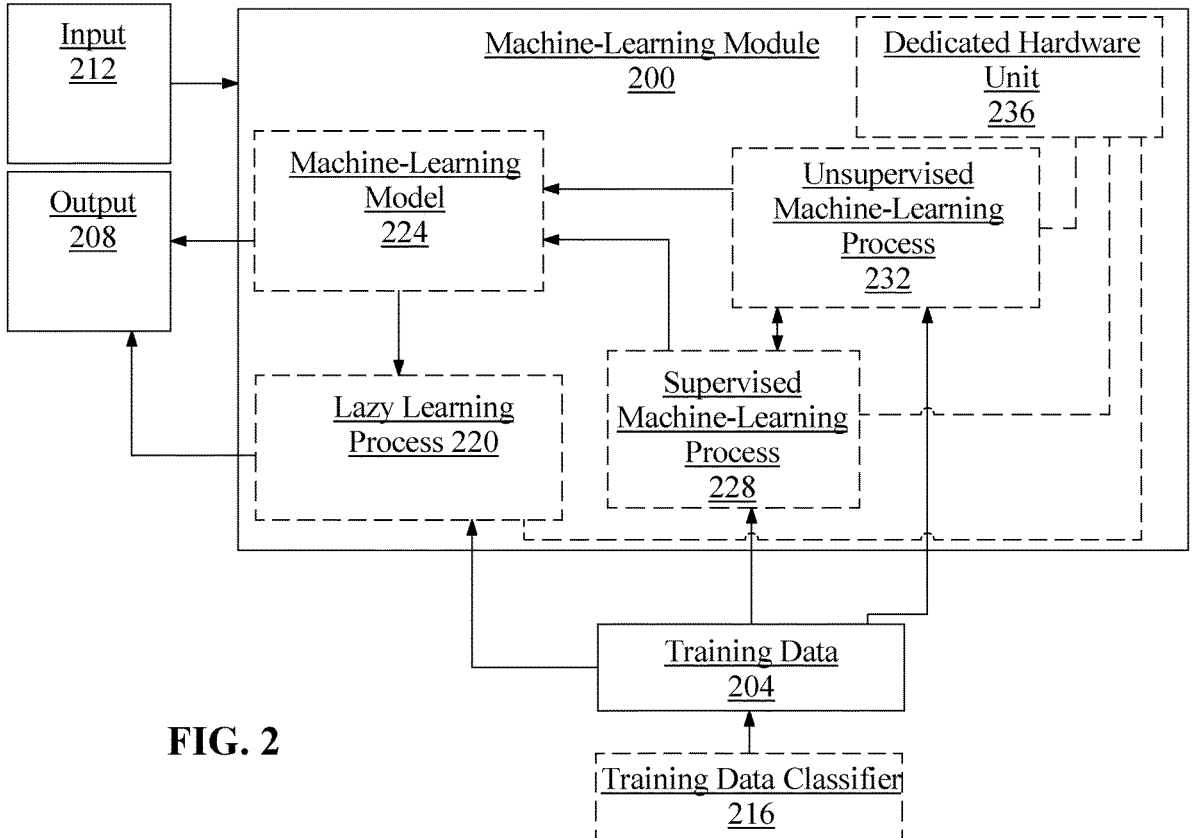
FIG. 2 is a block diagram of an exemplary embodiment of a machine learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example inputs may include specification datum 112 and outputs may include testing framework 128. In another example, without limitation, inputs may include application datum 116 and outputs may include integration datum 132.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classi- fication may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier may classify elements of training data to test sets. In another non-limiting example, Still referring to FIG. 2, computing device 204 may be configured to generate a classifier using a Naïve Bayes classification algorithm. Naïve Bayes classification algo- rithm generates classifiers by assigning class labels to prob- lem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypoth- esis. A naïve Bayes algorithm may be generated by first transforming training data into a frequency table. Comput- ing device 204 may then calculate a likelihood table by calculating probabilities of different data entries and classi- fication labels. Computing device 204 may utilize a naïve Bayes equation to calculate a posterior probability for each class. A class containing the highest posterior probability is the outcome of prediction. Naïve Bayes classification algo- rithm may include a gaussian model that follows a normal distribution. Naïve Bayes classification algorithm may include a multinomial model that is used for discrete counts. Naïve Bayes classification algorithm may include a Ber- noulli model that may be utilized when vectors are binary.

With continued reference to FIG. 2, computing device 204 may be configured to generate a classifier using a K-nearest neighbors (KNN) algorithm. A "K-nearest neighbors algo- rithm" as used in this disclosure, includes a classification method that utilizes feature similarity to analyze how closely out-of-sample-features resemble training data to classify input data to one or more clusters and/or categories of features as represented in training data; this may be per- formed by representing both training data and input data in vector forms, and using one or more measures of vector similarity to identify classifications within training data, and to determine a classification of input data. K-nearest neigh- bors algorithm may include specifying a K-value, or a number directing the classifier to select the k most similar entries training data to a given sample, determining the most common classifier of the entries in the database, and clas- sifying the known sample; this may be performed recur- sively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data ele- ments.

With continued reference to FIG. 2, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimen- sional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector simi- larity may alternatively or additionally be determined using averages of similarities between like attributes, or any other measure of similarity suitable for any n-tuple of values, or aggregation of numerical similarity measures for the pur- poses of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while pre- serving any dependency on similarity of attributes; this may, for instance, be advantageous where cases represented in training data are represented by different quantities of samples, which may result in proportionally equivalent vectors with divergent values.

With further reference to FIG. 2, training examples for use as training data may be selected from a population of potential examples according to cohorts relevant to an analytical problem to be solved, a classification task, or the like. Alternatively, or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 2, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively, or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a non-limiting example, sanitation may include utilizing algorithms for identifying duplicate entries or spell-check algorithms.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 2, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 2, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 2, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images. In a non-limiting example, data augmentation may be used for augmenting data with framework machine learning model 152, such as augmenting data related to specific testing sets within testing framework 128.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include specification datum 112, such as a specific function of a hardware component, and emulation parameters 120 as described above as inputs, testing framework 128 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure. As used in this disclosure "matrix" is a rectangular array or table of numbers, symbols, expressions, vectors, and/or representations arranged in rows and columns. Matrix may be generated by performing a singular value decomposition function. As used in this disclosure a "singular value decomposition function" is a factorization of a real and/or complex matrix that generalizes the eigen decomposition of a square normal matrix to any matrix of m rows and n columns via an extension of the polar decomposition. For example, and without limitation singular value decomposition function may decompose a first matrix, A, comprised of m rows and n columns to three other matrices, U, S, T, wherein matrix U, represents left singular vectors consisting of an orthogonal matrix of m rows and m columns, matrix S represents a singular value diagonal matrix of m rows and n columns, and matrix $V^T$ represents right singular vectors consisting of an orthogonal matrix of n rows and n columns according to the function:

$$A_{mxn} = U_{mxm} S_{mxn} V_{nxn}^T$$

singular value decomposition function may find eigenvalues and eigenvectors of $AA^T$ and $A^T A$. The eigenvectors of $A^T A$ may include the columns of IT, wherein the eigenvectors of $AA^T$ may include the columns of U. The singular values in S may be determined as a function of the square roots of eigenvalues $AA^T$ or $A^T A$, wherein the singular values are the diagonal entries of the S matrix and are arranged in descending order. Singular value decomposition may be performed such that a generalized inverse of a non-full rank matrix may be generated.

Figure 3:
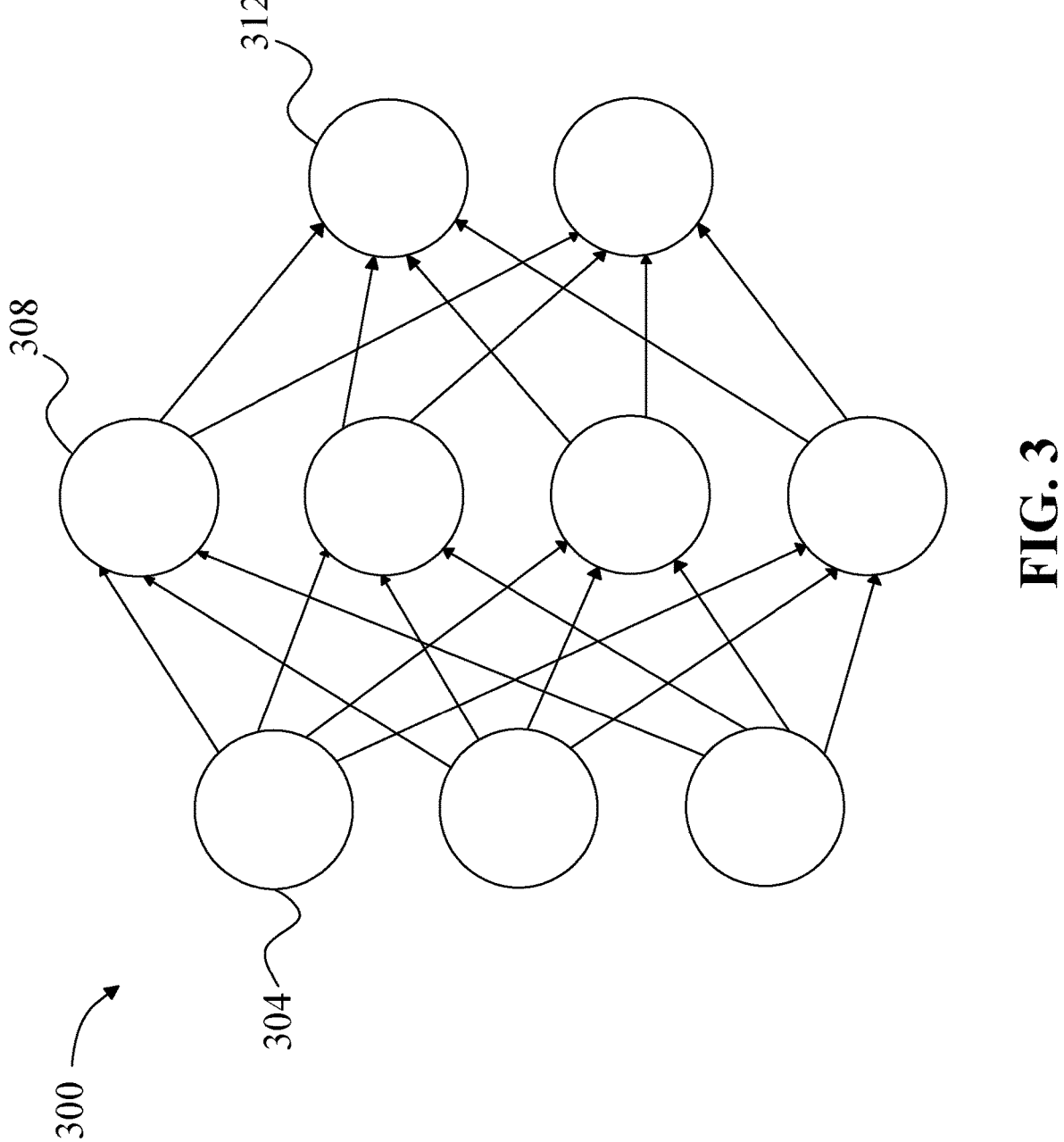
FIG. 3 is a diagram of an exemplary embodiment of a neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
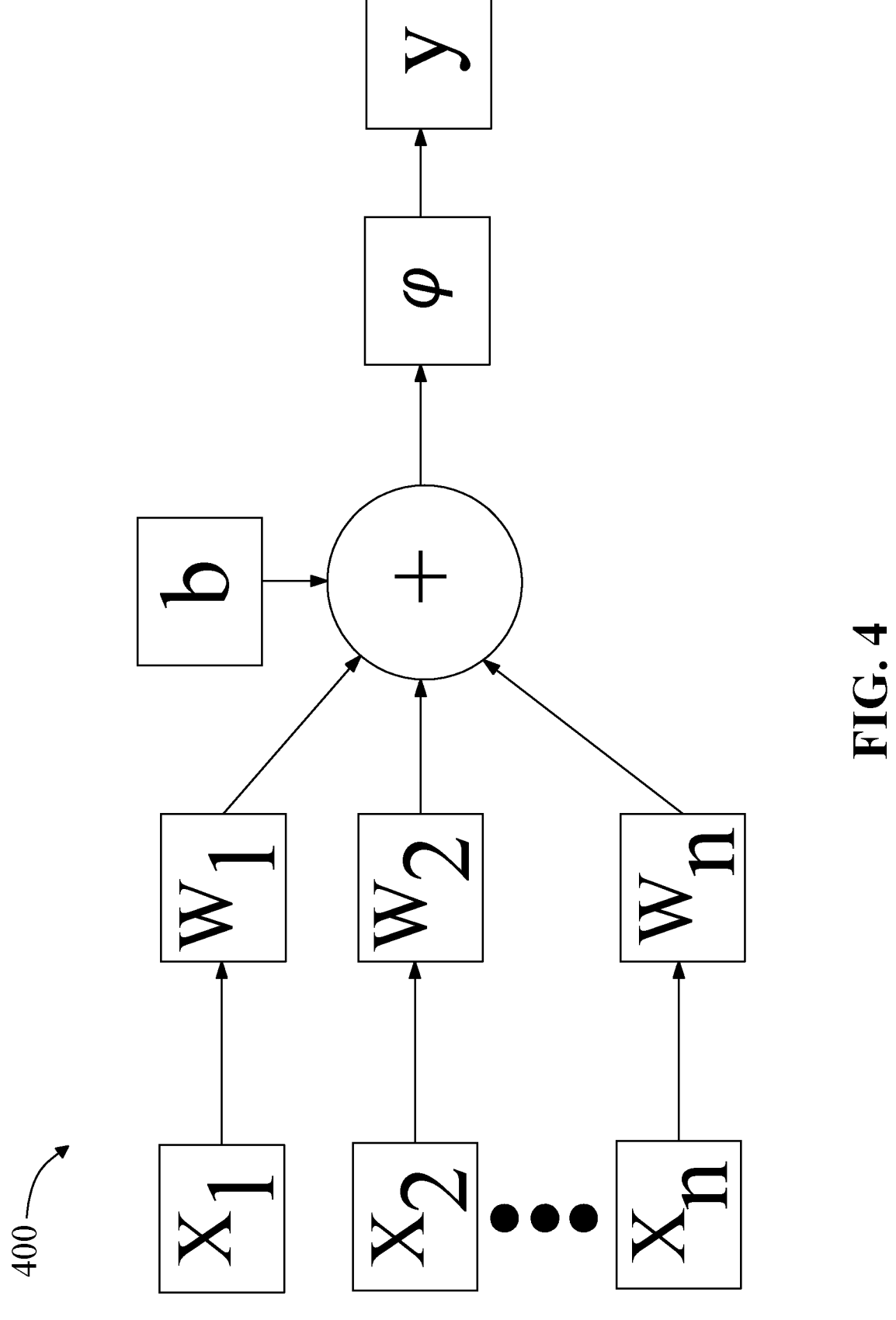
FIG. 4 is a diagram of an illustrative embodiment of a node of a neural network.

Referring now to FIG. 4, an exemplary embodiment of a node 400 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
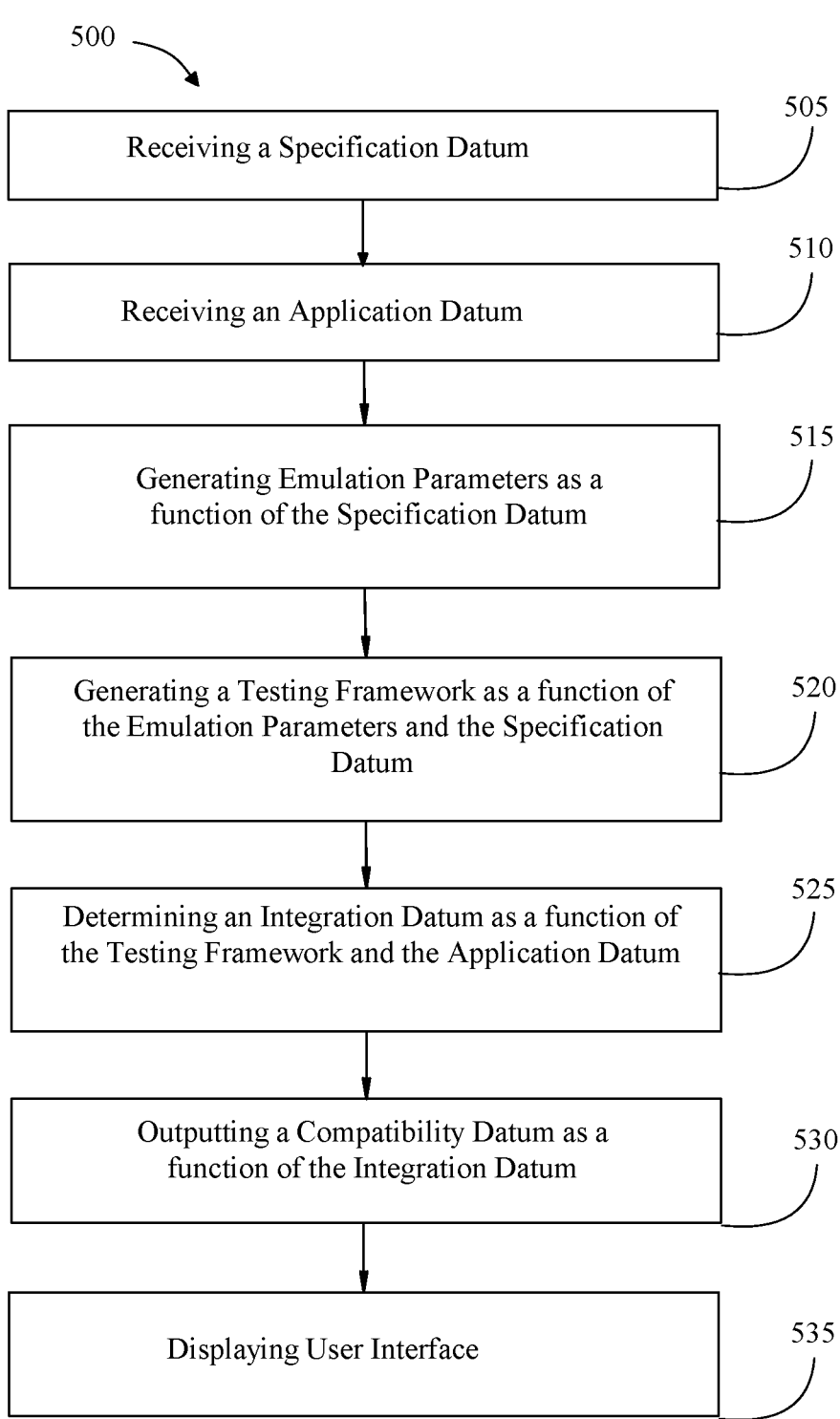
FIG. 5 is an exemplary embodiment of a method for engineering development support.

Now referring to FIG. 5, a method 500 of simulated virtual component testing is illustrated. In an embodiment, method 500, at step 505, includes receiving specification datum 112. Specification datum 112 may be received using any secured transmission described throughout this disclosure, such as containerized environment. In embodiments, specification datum 112 may be included in a hard drive communicatively connected to processor 104, Field Programmable Gate Array, Boot Operating Storage Solution Card, and the like. This may be implemented, without limitation, as described above with reference to FIGS. 1-4.

Continuing to refer to FIG. 5, at step 510, method 500 includes receiving application datum 116. Similar to above, application datum may be included in a hard drive, or any other storage medium, communicatively connected to processor 104. In embodiments, application datum 116 may be received through any secured transmission described herein. This may be implemented, without limitation, as described above with reference to FIGS. 1-4.

Still referring to FIG. 5, method 500, at step 515 includes generating emulation parameters 120 as a function of specification datum 112. In embodiments, determining emulation parameters 120 may include identifying engineering methodology 124. In an embodiment, emulation parameter may be configured to generate a digital twin. This may be implemented, without limitation, as described above with reference to FIGS. 1-4.

With continued reference to FIG. 5, at step 520, method 500 includes generating testing framework 128 as a function of emulation parameters 120. In some embodiments, method 500 may include generating a deployment environment 144. In embodiments, method 500 may include generating a deployment environment as a function of testing framework 128. In further embodiments, method 500 may further include generating a deployment environment 144 as a function of automated artifact 140. In a non-limiting example, automated artifact 140 may be used to generate deployment environment 144 for further testing of component, such as when re-running tests using same testing framework 128. In embodiments, method 500 may further include generating container 148. This may be implemented, without limitation, as described above with reference to FIGS. 1-4.

Continuing to refer to FIG. 5, method 500, at step 525, includes determining integration datum 132 as a function of testing framework 128 and application datum 116. In embodiments, method 500 may include determining integration datum 132 as a function of integration machine learning model 156. In some embodiments, method 500 may include storing integration datum 132 in an immutable sequential listing. Immutable sequential listings are described in more detail in reference to FIG. 5.

Still referring to FIG. 5, method 500, at step 530, includes outputting compatibility datum 136 as a function of integration datum 132. This may be implemented, without limitation, as described above with reference to FIGS. 1-4.

Continuing to refer to FIG. 5, method 500, at step 530, includes displaying a user interface using a display device. This may be implemented, without limitation, as described above with reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
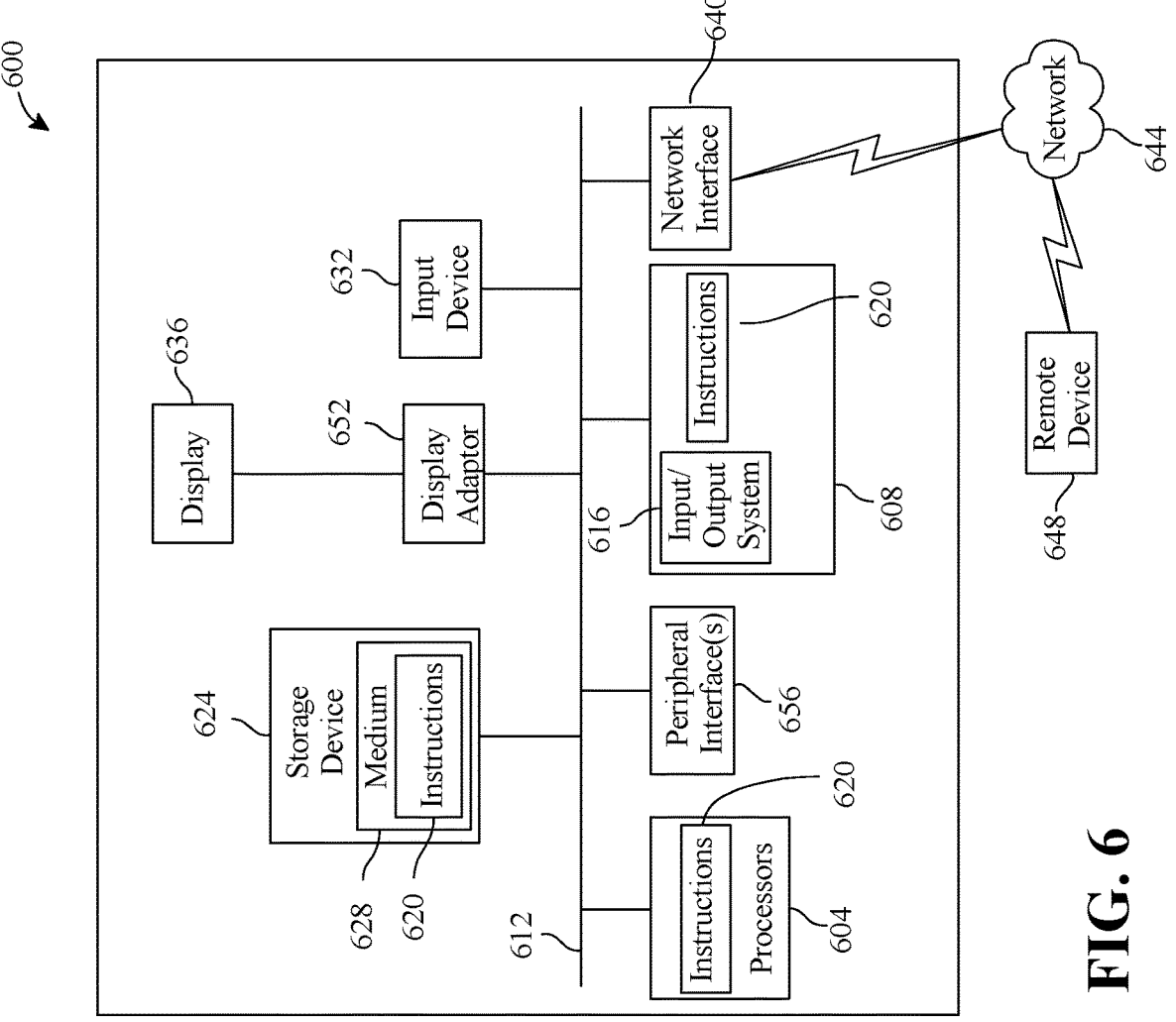
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, a dedicated artificial Intelligence (AI) chipset, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatus, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for simulated virtual component development, the apparatus comprising:

at least a processor; and at least a memory communicatively connected to the at least a processor, wherein the at least a memory contains instructions configuring the at least a processor to:

receive a specification datum;

receive an application datum;

generate emulation parameters as a function of the specification datum, wherein the emulation parameters comprise identification of an engineering methodology which includes a set of procedures to solve engineering problems, wherein the engineering methodology comprises an agile engineering technology;

execute the agile engineering methodology by iteratively testing sub-components of a component included in the specification datum followed by testing of a whole component;

generate a testing framework as a function of the emulation parameters and execution of the agile engineering methodology;

determine an integration datum by inputting into an integration machine learning model the testing framework and the application datum and receiving as an output from the integration machine learning model the integration datum, wherein the integration datum is generated within a containerized environment including a container image, wherein the container image includes a portable executable image combined with a manifest file;

output a compatibility datum as a function of the integration datum;

generate an automated artifact as a function of compatibility datum, wherein the automated artifact comprises data objects including at least executable files;

generate a deployment environment as a function of the automated artifact for further testing of the component, including its sub-components, wherein generating the deployment environment comprises:

implementing context insertion through a vector database, wherein the vector database is used to provide additional information for generating deployment environment; and deploying the containerized environment; and a display device configured to display a user interface for the compatibility datum.

2. The apparatus of claim 1, wherein at least one of the emulation parameters is configured to generate a digital twin.

3. The apparatus of claim 2, wherein the digital twin is configured to simulate at least a specification datum.

4. The apparatus of claim 1, wherein the specification datum comprises a specification of a Field Programmable Gate Array.

5. The apparatus of claim 1, wherein the specification datum comprises a specification of a Boot Operating Storage Solution Card.

6. The apparatus of claim 1, wherein the user interface is configured to display at least a layer of structural detail of the specification datum.

7. A method of simulated virtual component development, the method comprising:

receiving, by at least a processor, a specification datum;

receiving, by the at least a processor, an application datum;

generating, by the at least a processor, emulation parameters as a function of the specification datum, wherein the emulation parameters comprise identification of an engineering methodology which includes a set of procedures to solve engineering problems, wherein the engineering methodology comprises an agile engineering technology;

executing, by the at least a processor, the agile methodology by iteratively testing sub-components of a component included in the specification datum followed by testing of a whole component;

generating, by the at least a processor, a testing framework as a function of the emulation parameters and execution of the agile engineering technology;

determining, by the at least a processor, an integration datum by inputting into an integration machine learning model the testing framework and the application datum and receiving as an output from the integration machine learning model the integration datum, wherein the integration datum is generated within a containerized environment including a container image, wherein the container image includes a portable executable image combined with a manifest file;

outputting, by the at least a processor, a compatibility datum as a function of the integration datum;

generating, by the at least a processor, an automated artifact as a function of compatibility datum, wherein the automated artifact comprises data objects including at least executable files;

generating, by the at least a processor, a deployment environment as a function of the automated artifact for further testing of the component, including its sub-components, wherein generating the deployment environment comprises:

implementing context insertion through a vector database, wherein the vector database is used to provide additional information for generating deployment environment; and deploying the containerized environment; and displaying, by a display device, a user interface for the compatibility datum.

8. The method of claim 7, wherein the at least one of the emulation parameters is configured to generate a digital twin.

9. The method of claim 8, wherein the digital twin is configured to simulate at least a specification datum.

10. The method of claim 7, wherein the specification datum comprises a specification of a Field Programmable Gate Array.

11. The method of claim 7, wherein the specification datum comprises a specification of a Boot Operating Storage Solution Card.

12. The method of claim 7, wherein the user interface is configured to display at least a layer of structural detail of the specification datum.

* * * * *